July 31, 1962 F. D. REILAND 3,047,650
SERVICE FITTING HOUSING FOR UNDER-FLOOR WIRING SYSTEM
Filed June 24, 1959 2 Sheets-Sheet 2

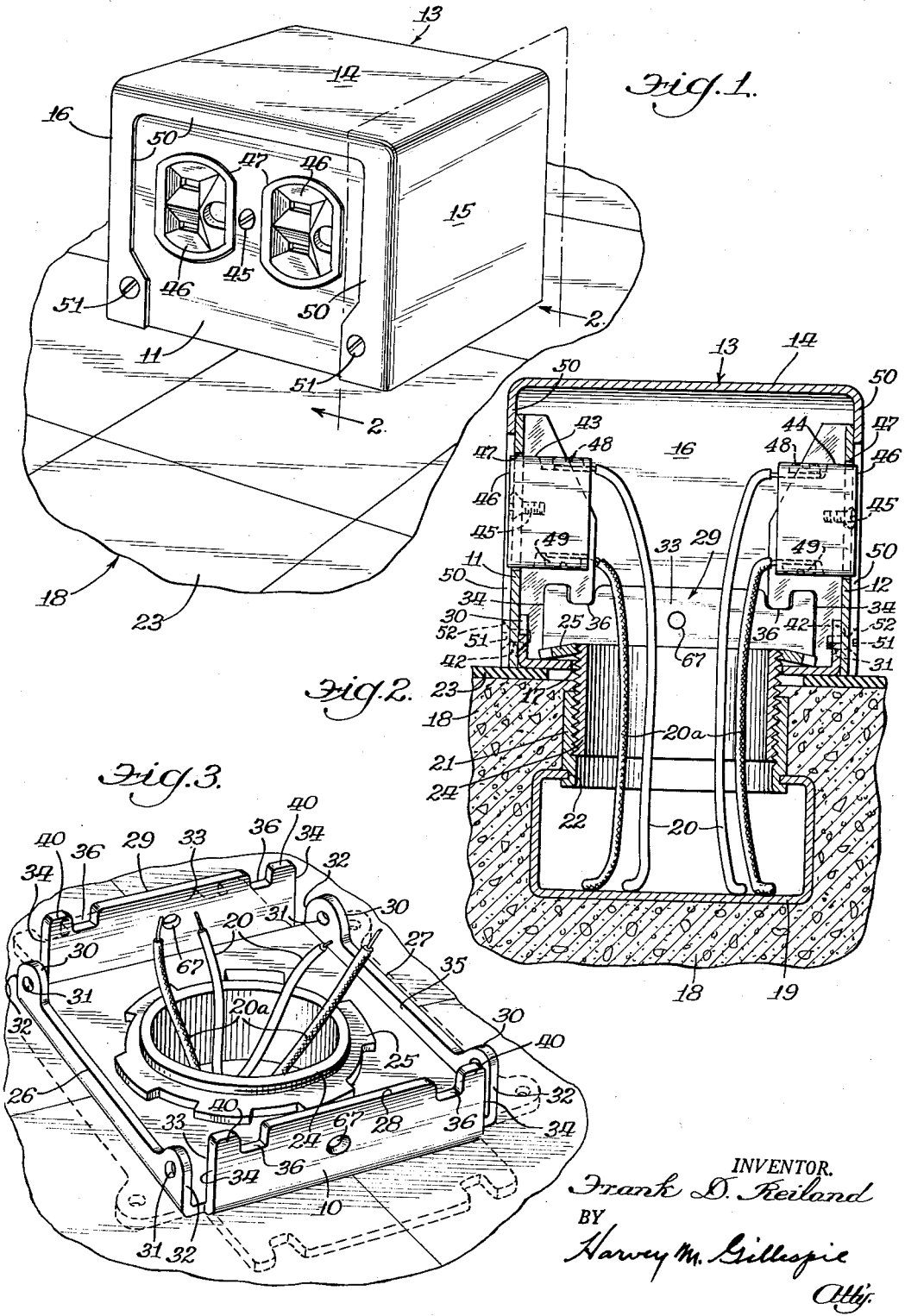

INVENTOR.
Frank D. Reiland
BY Harvey M. Gillespie
Atty.

United States Patent Office 3,047,650
Patented July 31, 1962

3,047,650
SERVICE FITTING HOUSING FOR UNDER-FLOOR WIRING SYSTEM
Frank D. Reiland, Chicago, Ill., assignor, by mesne assignments, to Square D Company, Park Ridge, Ill., a corporation of Michigan
Filed June 24, 1959, Ser. No. 822,543
8 Claims. (Cl. 174—49)

This invention relates to an improved service fitting housing for use in electrical wiring systems in general and which is especially suited for use in connection with under-floor wiring systems for buildings.

In wiring systems of the above character the electrical wiring of a building is distributed to different areas thereof by means of metallic conduits or races positioned below the surface of the floor. The wiring of high and low voltages are housed in separate conduits so as to avoid electrical interferences and to simplify the handling and connection of the various circuits.

The service fitting housing of the present invention is designed to enclose suitable fittings for selected circuits, for example receptacles for accommodating one or more insertion plugs for power circuits or suitable connector blocks or other fittings currently used as terminal attachments of the lower voltage circuits such as telephone, inner communication circuits, annunciators, buzzers, and the like. The improved housing communicates with an underlying trunk line or branch conduit through an attaching nipple having a cross-sectional area which is only slightly less than the cross-sectional area of the under-floor duct. Consequently, a large number of wires can be connected through a single service fitting housing without undue crowding.

The principal object of the invention is to provide an improved service fitting housing which will be of simple and relatively inexpensive construction which will be sightly in appearance and which will simplify the work of connecting the wiring to terminals, some of which, except for the present improvements, would be practically inaccessible.

According to the invention the housing is composed of a plurality of interfitting parts which may be readily and conveniently assembled either in whole or in part for purpose of shipment and in which certain of the parts may be removed from the assembly as a whole to simplify the making of electrical connections and thereafter interfitted with its associated parts in the assembly. In this connection the improved housing includes a base member formed with a central opening and is suitably attached to the floor and to an underlying conduit for electrical wiring, at least one side member of the housing is formed separate from the other housing members and is removably interlocked with a marginal portion of the base member. A slipover cover or hood which has a "slip-over" engagement with the said side and base members provides the top and other side faces of the housing. Certain of the side walls of the housing are provided with openings for receiving the projecting face portions of special or conventional receptacles for receiving the "plug-in" connectors. Other side walls may be provided with openings for receiving suitable bushings for surrounding multiple wire cables leading out of the service housing, for example multiple wires leading to a telephone switchboard or to other locations of use. Selected pairs of the electrical wires contained in the main conduit enter the service fitting housing through a connecting sleeve which is threaded into an element of the under-floor duct system and projects through the central opening of the base portion of the improved housing.

The invention is illustrated in certain preferred embodiments in the accompanying drawings wherein:

FIG. 1 is a view in perspective of a service fitting housing for electrical wiring constructed in accordance with this invention;

FIG. 2 is a cross-sectional view taken on line 2—2 of FIG. 1 illustrating the improved housing and part of the floor structure in section;

FIG. 3 is a view in perspective of the base element of the improved housing structure;

Figure 4:
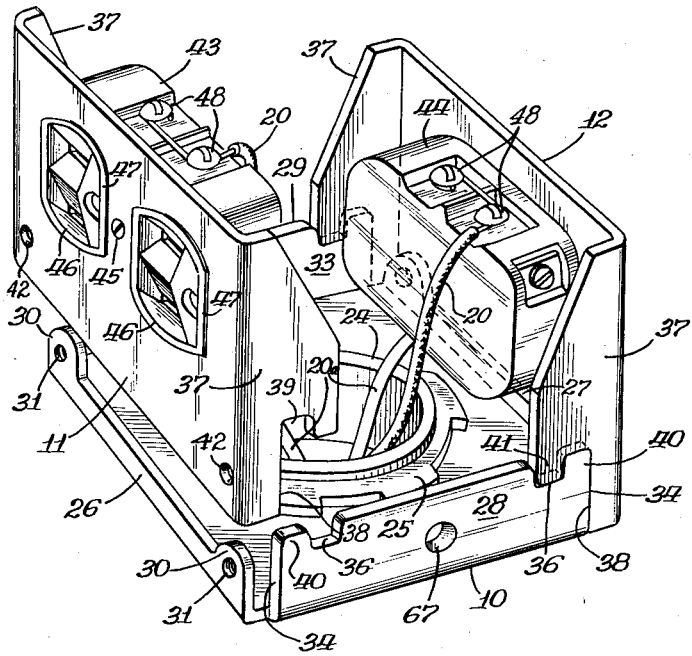
FIG. 4 is a view in perspective of the said base structure together with certain side walls associated therewith.

The invention, as shown in FIGS. 1 to 4, inclusive, may be described briefly as a pressed metal sectional housing comprising a base portion 10, removable and interchangeable side wall members 11, 12 and a slipover cover or hood 13, the latter of which provides the top 14 and two opposed side walls 15, 16 which cooperate with the base portion 10 and the sides 11, 12 to complete the housing.

The base member is provided with a central opening 17 and is clamped to the floor structure 18 in a position overlying an under-floor conduit 19 containing the wiring of the system. The conduit 19 containing the wiring 20, 20ᵃ is embedded in the concrete floor 18 and is provided with an upwardly extending tubular insert 21 which is fitted into an opening 22 formed in the upper wall of the conduit 19 and extends upwardly to a location near the top surface of the floor. Any suitable floor covering 23 may be interposed between the body of concrete 18 and the base 10 of the housing. The said housing is clamped to the floor structure by means of a tubular externally threaded nipple 24. This nipple is threaded into the tubular insert 21 and extends through the opening 17 in the base member 10 of the housing to provide an access passageway leading from the interior of the housing into the conduit 19. A ring type clamp nut 25 is threaded onto the upper end of the nipple 24 and clampingly engages the top surface of base 10 so as to draw the base firmly against the floor structure. Preferably the ring 25 is cupped slightly and threaded onto the sleeve so that the outer edge of the ring will make initial contact with the base and thereby function as a resilient lock nut.

The marginal portions of the base member 10 are initially constructed in the form of flat tabs as shown in broken lines in FIG. 3. They are thereafter bent upwardly to provide a pair of vertically extending flanges 26, 27 and a second pair of vertically extending flanges 28, 29. The flanges 26 and 27 extend along opposed margins of the base and are of identical construction, each including a lug 30 at each end thereof provided with an internally threaded aperture 31. The vertical plane of the edges 32, 32 of each flange 26, 27 coincides with the vertical plane of the inner faces 33, 33 of the flanges 28, 29. The flanges 28, 29 are also identical with each other. Their opposite end surfaces 34, 34 stop short of the plane of the inner faces 35, 35 of the flanges 26, 27 and their top edges are each formed with identical recesses 36, 36 to facilitate interlocking engagement with the interchangeable side wall members 11 and 12, to be described presently.

The side wall members 11, 12 are formed with flat perpendicular faces which overlap the outer surfaces of the base flanges 26, 27 and are provided along their vertical margins with inturned supporting flanges 37, 37, the lower edges of which are adapted to seat on the floor covering 23. The flanges 37 are recessed to provide surfaces which cooperate with correspondingly formed surfaces on the base flanges 28, 29 to effect supporting contact and interlocking engagement therewith. In this connection each recessed flange 37 includes a perpendicular edge face 38 for engaging a vertical edge face 34 of a base flange 28 or 29, a slot 39 for receiving one of the tongues 40 formed on the base, and a tongue 41 fitting into one of said recesses 36 formed in the base flanges 28, 29. When the inturned flanges 37 of the side members 11 and 12 are interlocked with the base flanges 28, 29, they are maintained in position by virtue of said interlocked engagement and the bottom marginal faces of the side members 11 and 12 overlap the outer faces of the base flanges 26, 27 to a position flush with the bottom face of the base, and apertures 42 formed in the opposite lower corners of the members 11 and 12 register with the threaded apertures 31 formed in the base flanges 26, 27. The base flanges 28, 29 are provided with holes 67 for use in the modification of the invention shown in FIGURES 5 and 6.

The improved housing, because of its removable side members 11, 12 and cover 13, permits a plurality of conventional receptacle fittings 43, 44 or other electrical connector blocks to be arranged in close relation within the housing without interfering with the work of attaching the wires to the several terminal clamps or screws. In FIGS. 2 and 4, of the drawings, two insulated receptacle fittings 43, 44 of conventional construction are arranged back to back and secured to the opposed side wall members 11, 12 by means of screws 45. Both receptacle fittings are shown herein as having twin plug receiving socket portions 46, 46 projecting through suitable openings 47, 47 formed in the side wall members 11, 12. Each receptacle fitting is provided on its top face with a pair of terminal screws 48, to which one wire 20 is connected in the usual manner. The other wire 20ᵃ for completing the electrical circuit is connected in an approved manner to a pair of terminal screws 49, 49 projecting downwardly from the bottom face of each fitting. In order to connect the wires 20ᵃ to the lower terminal screws, the side members 11 and 12 may be readily removed from their interlocked engagement with the base of the housing, whereupon the lower terminal screws 49, 49 are made readily accessible. After the wires 20ᵃ are suitably connected to the terminal screws 49, 49 the side members may be returned to their interlocked engagement with the base, which positions are retained by virtue of said interlocked engagement during the application of the hood type of top cover 13.

The said top cover 13 is a metal stamping of generally inverted U-shape configuration providing a top 14 and integral opposed side walls 15, 16. The marginal portions of the top 14 and the said integral walls are provided with vertical flanges 50, which overlap and telescopically engage the top marginal portions and the vertical corners of the removable side walls 11, 12. The integral side portions 15, 16 of the cover slide, in telescopic fashion, over the outer faces of the inturned marginal flanges 37 of the removable side wall members 11, 12.

When the cover 13 is in its applied position, all parts of the housing are firmly locked in their assembled relation by means of screws 51 which extend through countersunk apertures 52 (see FIG. 2) formed in the flanges 50, the apertures 42 in the removable side wall members 11, 12 and thread into the internally threaded apertures 31 formed in flanges 26, 27 of the base member 10.

Figure 6:
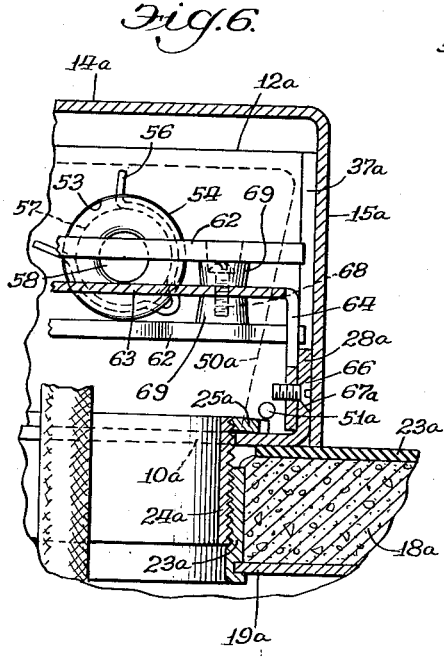
FIG. 6 is a fragmentary view taken on line 6—6 of FIG. 5 and illustrating certain parts of the housing in section and showing in elevation the electrical connector blocks associated therewith.
Figure 5:
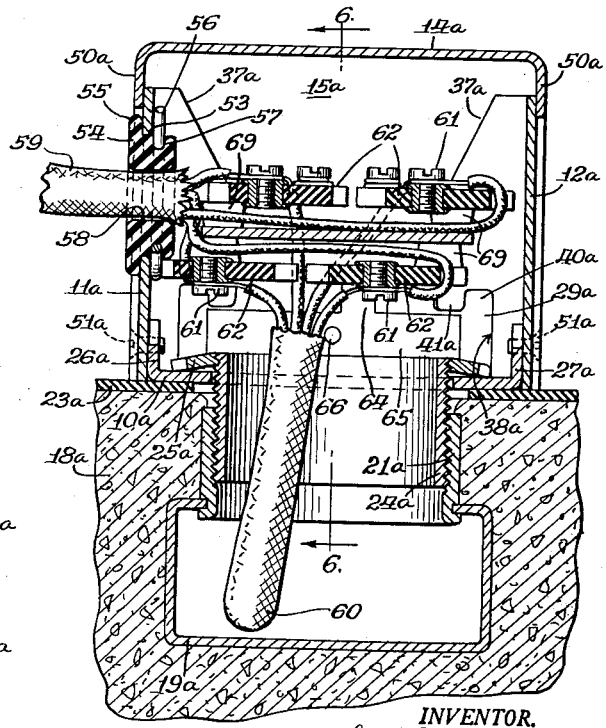
FIG. 5 is a sectional view similar to FIG. 2 but illustrating the housing construction equipped for use in connection with multiple wire cables.

Referring now to the modified housing structure and connector block assembly shown in FIGS. 5 and 6: The housing structure shown in these figures is identical to the structure shown in FIGS. 1 to 4, inclusive, except that the inturned edges of the side flanges designated 50ᵃ instead of being perpendicular as shown in the previous figures extend downwardly at an angle, the removable side wall designated 12ᵃ is formed without any opening therein and the removable side wall designated 11ᵃ is formed with a single opening 53 therein for receiving an insulator bushing 54. This bushing is formed with a radial flange 55 for engaging the outer face of the removable side wall 11ᵃ and is secured in position by means of a spring cotter key 56 removably inserted in an annular groove 57 formed in the bushing. The opening 58 in the bushing may be of any size suitable for receiving a multiple wire cable 59. The reference numeral 60 designates a multiple wire cable located in the under-floor conduit designated 19ᵃ, the several wires of the cable being connected to terminal screws 61 threaded through contactor blocks 62. In the present disclosure only four contactor blocks 62 are shown, but the number of connector blocks may be varied in accordance with the requirements. Also, there are only two pairs of wires from the cable connected through the block 62 with corresponding pairs of wires of the cable section 59. However, the connector blocks 62 are of standard construction and usually include terminal screws 61 in sufficient number to accommodate five pairs of wires for each connector block.

The connector blocks are secured to a supporting frame comprising a plate 63 formed with downturned attaching legs 64, 64, the lower ends of which are provided with an extended foot 65 clamped to the inner faces of the upturned base flanges 28ᵃ, 29ᵃ by means of screws 66. These screws extend through openings 67ᵃ provided in the base flanges. The said connector blocks are provided with bosses 69, 69 and are clamped to the opposite faces of the said suporting plate 63 by means of screws 68 (FIG. 6). All other parts of the assembly shown in FIGS. 5 and 6 are identified by the reference characters used to identify corresponding parts shown in FIGS. 1 to 4, inclusive. In order to facilitate attachment of the multiple wires of cables 59 and 60 to the several connector blocks 62 the connector block supporting plate 63 can be readily detached from the base of the housing and removed therefrom by the removal of the said screws 66 whereupon the necessary connections can be made and the connecting blocks returned to their assembled position in the housing.

I claim:

1. A housing and service fitting assembly for an electrical wiring system comprising, in combination, a base member formed at opposite ends with upturned flanges each of which is formed with a pair of recesses, one adjacent either end thereof, opposed side walls formed separate from the base and provided with tongues fitted into said recesses to provide interlocking engagement with the base, an electrical service fitting supported above said base, there being an access opening in at least one of said side walls leading to the service fitting, and a slipover cover provided with opposed end walls formed with lower marginal portions overlapping the base and formed with marginal flanges overlapping the upper edges and the opposed vertical edges of said side members to hold these members interlocked with the base.

2. A housing for electrical service fittings according to claim 1, wherein the separately formed side walls are provided with angular flanges which align with the said notched flanges of the base and are provided with tongues fitting into said recesses to provide said interlocked engagement.

3. A housing for electrical service fittings according to claim 2 wherein an electrical service fitting is mounted on each of the side members interlocked with the base.

4. A housing for electrical service fittings according to claim 1, wherein the housing is positioned to overlie an under-floor conduit containing electrical wiring of the system and communicates with the said under-floor conduit through a tubular nipple connected with the under-floor conduit and projecting through a central opening in the base member and wherein the said base member is clamped to the floor by means of a lock nut threaded onto the upper end of said nipple.

5. A housing for electrical service fittings according to claim 4 wherein the electrical service fitting includes a contact block secured to a supporting frame which is removably attached to the base, and a bushing of electrical insulation is removably fixed in said access opening.

6. A housing and service fitting assembly for an electrical wiring system comprising a base member, a separable side wall having a main portion and a pair of vertically extending lateral supporting flanges extending from said main portion and engaging said base member, an electrical service fitting supported on the inner face of said main portion of said separable side wall and removable therewith to provide ready access to parts thereof, and a slipover cover member providing a top and a pair of opposed side walls integral therewith, said top and opposed side walls of said cover member having marginal flanges overlapping said main portion of said separable side wall at the top and vertical marginal portions thereof, said opposed side walls of said cover member having lower marginal portions telescoping over portions of said base member, and said lateral supporting flanges of said separable side wall supporting said main portion thereof in a vertical position by engagement of said lateral supporting flanges with said base member when said cover member is removed.

7. A housing and service fitting assembly as claimed in claim 6, wherein said base member has a pair of opposed upturned marginal flanges having aligned recesses in their upper edges and said lateral supporting flanges of said separable side wall have tongues respectively projecting into said recesses to interlock said separable side wall with said base member.

8. A housing and service fitting assembly for an electrical wiring system comprising a base member, a pair of opposed separable side walls each having a main portion and a pair of vertically extending lateral supporting flanges extending from said main portion and engaging said base member, a pair of electrical service fittings respectively supported on the inner faces of said main portions of said separable side walls and removable therewith to provide ready access to parts thereof, and a slipover cover member providing a top and a pair of opposed side walls integral therewith, said top and opposed side walls of said cover member having marginal flanges respectively overlapping said main portions of said separable side walls at the top and vertical marginal portions thereof, said opposed side walls of said cover member having lower marginal portions telescoping over portions of said base member, and said lateral supporting flanges of said separable side walls respectively supporting said main portions thereof in vertical positions by engagement of said lateral supporting flanges with said base member when said cover member is removed.

References Cited in the file of this patent

UNITED STATES PATENTS

| | | |
|---|---|---|
| 2,120,424 | Forstrom | June 14, 1938 |
| 2,457,023 | Zelt | Dec. 21, 1948 |
| 2,738,892 | Wiesmann | Mar. 20, 1956 |
| 2,848,134 | Carlson | Aug. 19, 1958 |
| 2,881,940 | Hamilton | Apr. 14, 1959 |
| 2,907,813 | Hudson | Oct. 6, 1959 |
| 2,932,683 | Flachbarth | Apr. 12, 1960 |
| 2,961,480 | Murray | Nov. 22, 1960 |